Nov. 6, 1928.
T. H. THOMAS
1,690,316
ANGLE COCK DEVICE
Filed Oct. 27, 1927
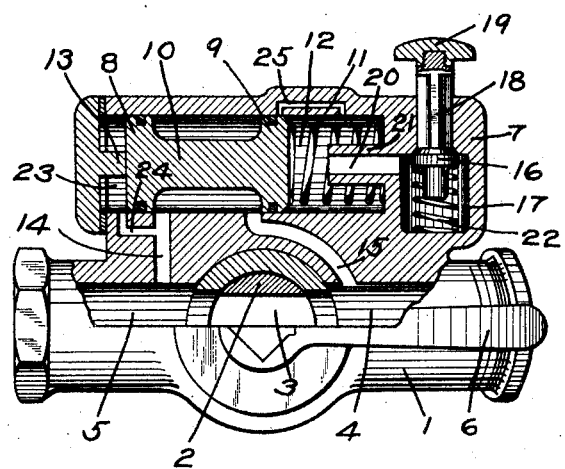
INVENTOR
THOMAS H. THOMAS
BY *Wm. N. Cady*
ATTORNEY Patented Nov. 6, 1928.

1,690,316

UNITED STATES PATENT OFFICE.

THOMAS H. THOMAS, OF EDGEWOOD, PENNSYLVANIA, ASSIGNOR TO WESTINGHOUSE AIR BRAKE COMPANY, OF WILMERDING, PENNSYLVANIA, A CORPORATION OF PENNSYLVANIA.

ANGLE-COCK DEVICE.

Application filed October 27, 1927. Serial No. 229,091.

This invention relates to angle cocks, such as are employed to control communication through the brake pipe of a fluid pressure brake system.

In order to ensure that the brakes may still be controlled in case an angle cock in the brake pipe of a fluid pressure brake system be accidentally or maliciously closed, it has heretofore been proposed to provide a valve controlled by-pass for establishing communication from one side of the cock key to the other.

The principal object of my invention is to provide an improved angle cock device of the by-pass type in which the flow rate through the by-pass is sufficient to permit of an emergency rate of reduction in brake pipe pressure without tending to effect the closure of the by-pass controlling valve.

In the accompanying drawing, the single figure is a diagrammatic sectional view of an angle cock device embodying my invention.

The angle cock device may comprise a cock body 1 containing the usual plug valve or cock key 2 having a waterway 3 for establishing communication from conduit 4 at the hose side of the valve 2 to the conduit 5 at the opposite side, the key 2 being operated by the usual handle 6.

Associated with the cock body is a by-pass section 7 having a cylindrical chamber containing a piston having heads 8 and 9 connected by a stem 10. A spring 11 mounted in chamber 12 at one side of piston head 9 acts on piston head 9 and urges the piston toward the left to engage a stop lug 13. In the left hand position of the piston, the chamber intermediate the piston heads 8 and 9 connects passage 14 leading to conduit 5 with passage 15, leading to conduit 4.

A valve 16, contained in valve chamber 17 controls the venting of fluid under pressure from chamber 12 and is provided with a fluted stem 18 which extends out of the casing and carries a manually operable push button 19. The valve chamber 17 is connected to chamber 12 through a passage 20 in a stop lug 21, which lug acts as a stop to limit movement of piston head 9 toward the right. The valve 16 is urged to its seat by a spring 22.

In operation, when a train is being charged with fluid under pressure and with the angle cocks in open position, fluid under pressure flows through the waterway 3 of each angle cock in the usual manner. The valve 16 being normally seated, fluid pressure builds up in chamber 12 by leakage past the piston head 9, and also in chamber 23 by flow through a passage 24 which communicates with passage 14. The fluid pressures being balanced on opposite sides of the piston heads 8 and 9, the spring 11 holds the piston in its left hand position, as shown in the drawing.

If, with the train pipe charged with fluid under pressure, one or more angle cocks should be accidentally or maliciously turned to the closed position, flow through the brake pipe would not be interrupted, since the by-pass remains open through passage 14, the chamber intermediate the piston heads 8 and 9 and passage 15 and the flow area through the by-pass is large enough to permit of effecting an emergency as well as a service rate of reduction in brake pipe pressure.

It will also be noted that if an angle cock be in closed position before the charging of the brake pipe is initiated, the charging of the brake pipe will not be interfered with, since the flow will then take place through the by-pass, the piston remaining in its normal position.

If two cars are to be uncoupled and separated, the angle cocks at adjacent ends of the car are moved to the closed position and then the valve 16 is opened on each car by pressing the push button 19, so that fluid under pressure is vented from the chamber 12 of each angle cock. The double headed piston is then shifted by fluid pressure in chamber 23, so as to cut off communication through the by-pass passages 14 and 15. One of the buttons 19 is then held depressed, while the hose couplings are uncoupled, in order to ensure that the chambers 12 of the adjacent angle cocks are maintained at atmospheric pressure, the chamber 12 of the angle cock, the button 19 of which is not held depressed being held at atmospheric pressure by reason of the passage 25 which connects chamber 12 with the space at the opposite side of piston head 9, when said head as in its outer position. The space at the opposite side of the piston head 9 is open to passage 15 and consequently, through the flexible hose between the cars, is open to chamber 12 of the angle cock which has the button 19 depressed, which chamber is open to the atmosphere by way of the open valve 16, so that both chambers 12 of the adjacent angle cocks are maintained at atmospheric pressure, when one of the buttons 19 is held depressed.

After the hose couplings have been disconnected, the button 19 may be released and the valve 16 allowed to close, since the double headed piston on each car will now be maintained in its position closing the by-pass passages by fluid pressure in chamber 23, the chamber 12 being open to the atmosphere, through passage 25, passage 15, and the flexible hose connection, which is open to the atmosphere, when the hose couplings are disconnected.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. An angle cock device having a brake pipe controlling valve and provided with a by-pass for establishing communication from one side of the valve to the other, valve means for controlling communication through said by-pass, and a spring urging said valve means to its position for establishing communication through said by-pass.

2. An angle cock device having a cock key for controlling communication through a train pipe, a piston valve device for controlling a by-pass for establishing communication from one side of the key to the other, movement of said valve device to its closed position being adapted to establish communication from one side of said valve device to one side of the cock key.

3. An angle cock device having a cock key and provided with a by-pass for establishing communication from one side of the key to the other and a double headed piston having means for controlling communication through said by-pass.

4. An angle cock device having a cock key and provided with a by-pass for establishing communication from one side of the key to the other, a double headed piston having means for controlling communication through said by-pass, and a spring urging said piston to a position opening communication through said by-pass.

5. An angle cock device having a cock key and provided with a by-pass for establishing communication from one side of the key to the other, a double headed piston device for controlling communication through said by-pass and subject on one side to fluid pressure urging said piston device to its closed position, and a spring urging said piston device to its open position.

6. An angle cock device having a cock key and provided with a by-pass for establishing communication from one side of the key to the other, a double headed piston device for controlling communication through said by-pass and subject on one side to fluid pressure urging said piston device to its closed position, a spring urging said piston device to its closed position, and a manually operable valve for venting fluid from the spring side of said piston device.

In testimony whereof I have hereunto set my hand.

THOMAS H. THOMAS.